United States Patent
Costa et al.

(10) Patent No.: US 10,261,253 B1
(45) Date of Patent: Apr. 16, 2019

(54) OPTICAL COMBINER AND SPLITTER

(71) Applicants: Joannes M. Costa, Rancho La Costa, CA (US); Jay A. Chesavage, Palo Alto, CA (US)

(72) Inventors: Joannes M. Costa, Rancho La Costa, CA (US); Jay A. Chesavage, Palo Alto, CA (US)

(\*) Notice: Subject to any disclaimer, the term of this patent is extended or adjusted under 35 U.S.C. 154(b) by 31 days.

(21) Appl. No.: 15/044,104

(22) Filed: Feb. 15, 2016

(51) Int. Cl.
| | |
|---|---|
| *G02B 6/12* | (2006.01) |
| *G02B 6/125* | (2006.01) |
| *G02B 6/136* | (2006.01) |
| *G02B 6/132* | (2006.01) |
| *G02B 6/28* | (2006.01) |

(52) U.S. Cl.
CPC .......... *G02B 6/125* (2013.01); *G02B 6/132* (2013.01); *G02B 6/136* (2013.01); *G02B 6/2808* (2013.01); *G02B 2006/1215* (2013.01); *G02B 2006/12121* (2013.01); *G02B 2006/12123* (2013.01); *G02B 2006/12147* (2013.01)

(58) Field of Classification Search
CPC ................... G02B 6/42; G02B 6/125
See application file for complete search history.

(56) References Cited

U.S. PATENT DOCUMENTS

| | | | | |
|---|---|---|---|---|
| 4,165,225 A | * | 8/1979 | Auracher | G02B 6/30 156/296 |
| 6,501,886 B1 | * | 12/2002 | Rankin | G02B 6/125 385/48 |
| 7,854,149 B2 | * | 12/2010 | Fuflyigin | C03B 37/0183 65/417 |
| 2003/0002771 A1 | * | 1/2003 | Cheng | G02B 6/125 385/14 |
| 2003/0114006 A1 | * | 6/2003 | White | G02B 6/10 438/694 |
| 2004/0008944 A1 | * | 1/2004 | Johannessen | G02B 6/125 385/45 |

\* cited by examiner

*Primary Examiner* — Sung H Pak
*Assistant Examiner* — Hoang Q Tran
(74) *Attorney, Agent, or Firm* — File-EE-Patents.com; Jay A. Chesavage

(57) ABSTRACT

An optical power combiner, or splitter, is formed from a first substrate and a second substrate, each substrate having a substantially planar joining surface, at least one substrate having a plurality of waveguide channels formed such as by etching, the plurality of waveguide channels coupled to a waveguide channel combiner having a plurality of waveguide channel apertures, the optical combiner having a single channel aperture on an opposite side from the plurality of waveguide channel apertures, the single channel aperture coupled to a single waveguide channel of zero or greater length, and to an edge opposite the plurality of waveguide channels.

20 Claims, 10 Drawing Sheets

Optical Combiner, view A-A

Thin Film Optical Layers

Prior Art Optical Combiner

Optical Combiner, detail A-A
Prior Art

Optical Combiner, detail B-B
Prior Art

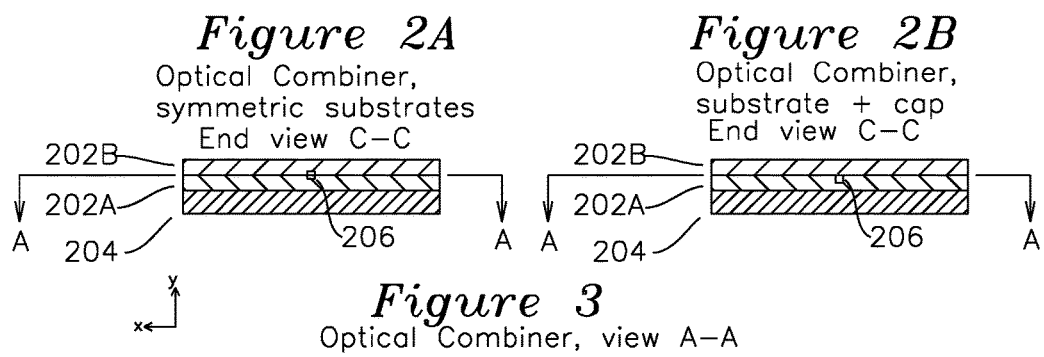
Figure 2A
Optical Combiner,
symmetric substrates
End view C-C
Figure 2B
Optical Combiner,
substrate + cap
End view C-C
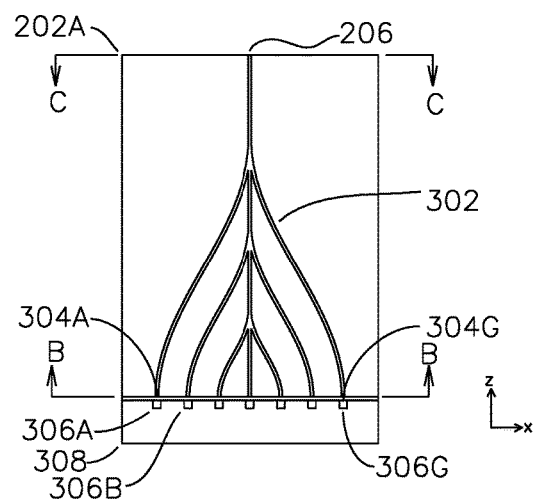
Figure 3
Optical Combiner, view A-A
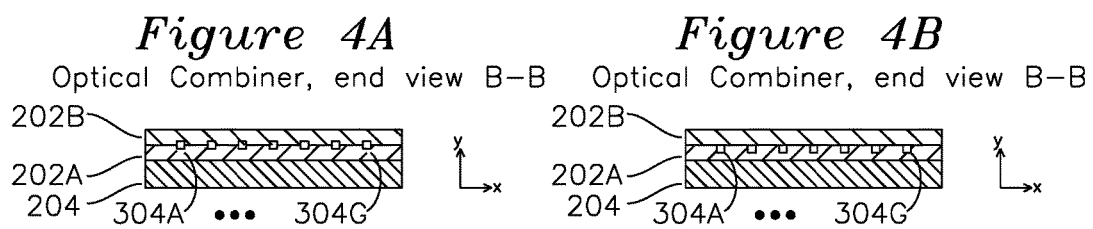
Figure 4A
Optical Combiner, end view B-B
Figure 4B
Optical Combiner, end view B-B Top View, Optical Combiner Optical combiner (Section C-C)

Optical Combiner (Section D-D)

Optical combiner (Section C-C)

Optical Combiner (Section D-D)

Optical Combiner, offset couplings

Optical Combiner, paired couplings

7:1 Optical combiner

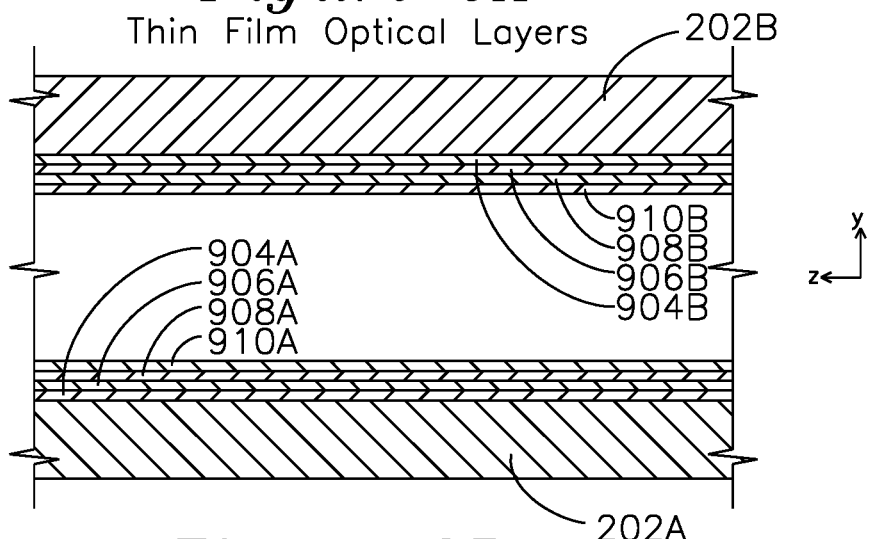
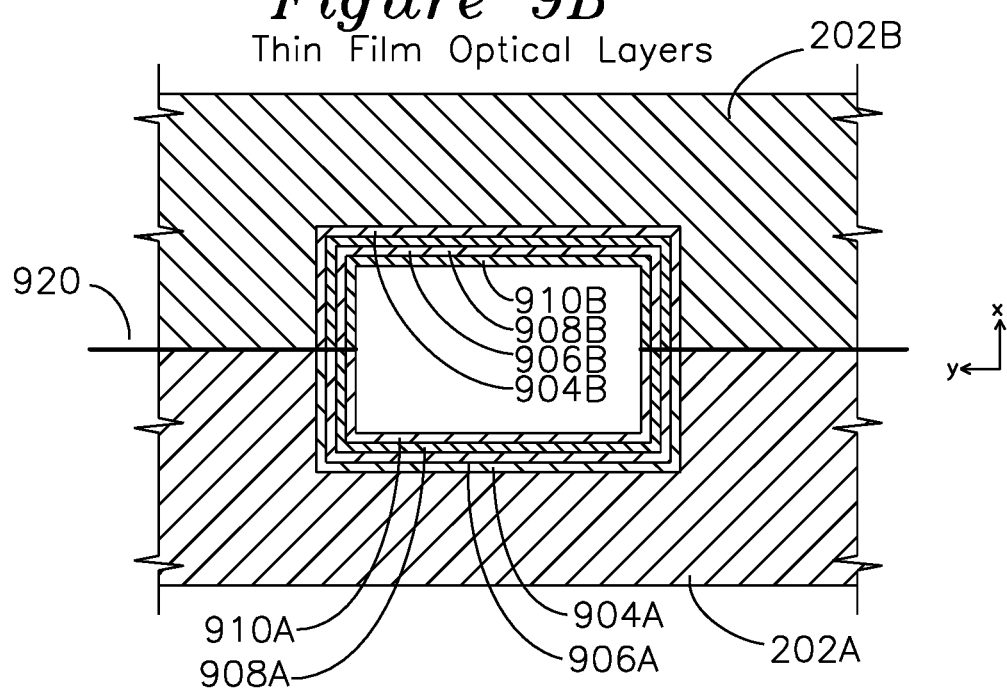

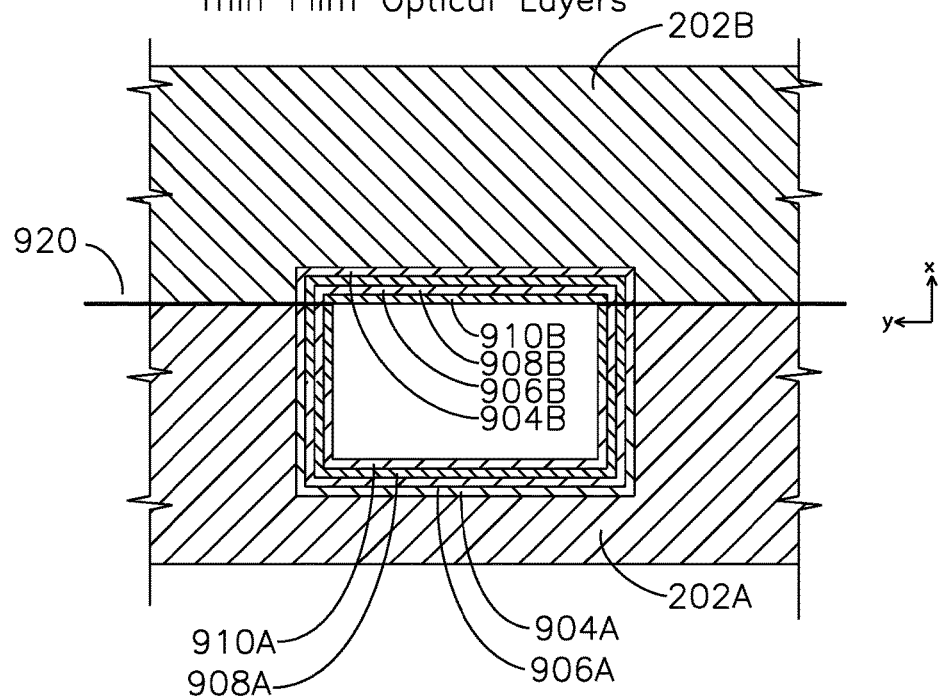
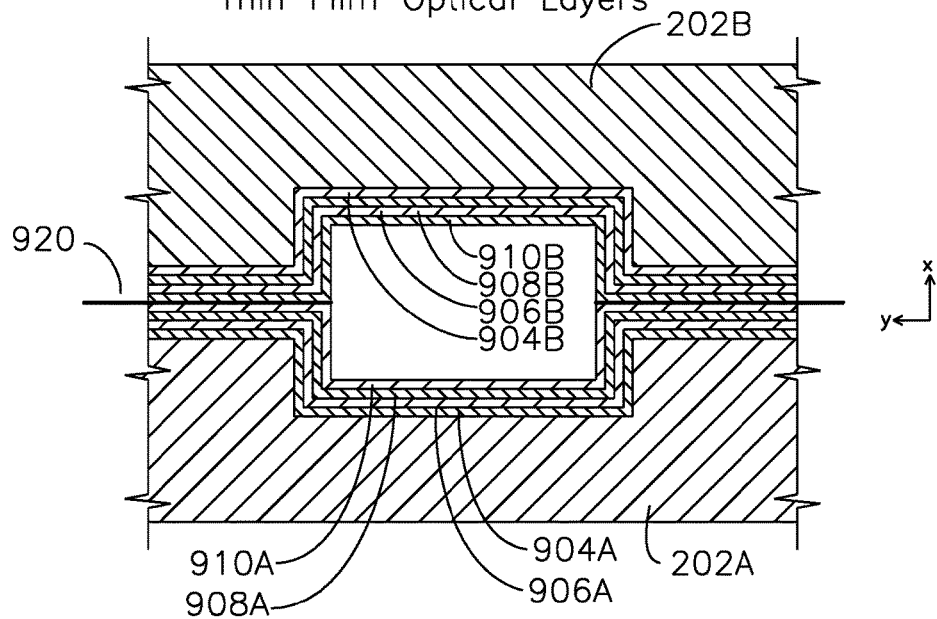

Thin Film Optical Layers m x n optical combiner

OPTICAL COMBINER AND SPLITTER

FIELD OF THE INVENTION

The present invention relates to an optical combiner and optical splitter. In particular, the invention relates to an optical combiner for use with a diode laser array for combining multiple high power optical beams into a single high power density optical beam output.

BACKGROUND OF THE INVENTION

FIG. 1 shows a prior art optical combiner 100 using a diode laser array 102, which provides a linear array of diode lasers on a single plane, typically with regular spacing (pitch) between each laser emitter 104a, 104b, etc. Each diode laser such as 104a is coupled using a refractive lens 108a to focus emitted optical energy into the core of a corresponding optical fiber 110a, and the multiple optical fibers are typically arranged in a circular packed arrangement at an output end 120, with an example of the fiber 110a circular packing of detail B-B as shown in FIG. 1B for 7 diode array 102 emitters coupled into the 7 fibers 110a-110g as shown. Because of this prior art use for coupling the output of a diode laser array into a circularly packed pattern (known as a hexagonal lattice in circle packing theory), the number of emitters on diode laser array 102 is typically set at the hexagonal lattice number N, where N=7, N=19, N=37, etc to achieve an optimal circular packing arrangement.

FIG. 1 also shows a detail region 106 which is presented in FIG. 1A detail A-A, showing diode laser array 102, individual laser emitters 104a and 104b of the array, each of which has a diverging optical output 109a, which is focused by corresponding lens 108a to the converging optical energy 111a from the output of the lens to the central core of optical fiber 110a, which guides the optical energy to the output end 120 of each optical fiber. The core 112a of one example optical fiber is shown with respect to optical fiber 110a in FIG. 1B.

It is also clear from FIG. 1B that, since the optical energy is only carried in the core such as 112a of each optical fiber such as 110a, the overall carried energy density from the plurality of diode laser outputs is reduced by this arrangement. A typical multimode optical fiber for high power applications has a core diameter of 200 μm which carries the optical energy, and a surrounding cladding diameter of 220 μm which guides the optical energy, and an outer jacket (not shown) which must be stripped to provide reasonable packing density limited by the cladding diameter. Assuming that each diode laser has 1 W output energy, the optical power density coupled to the core at the input of each optical fiber is 3183 W/cm$^2$ presuming focused beam size equal to the fiber core size. It is instructive to compare the power density coupled into the optical fiber with the power density coupled out of it as shown in FIG. 1B, where in our example (for a lossless system) 7 W of optical energy in a 660 um diameter circle (governed by the cladding diameter in our example), for an energy density of 2046 W/cm$^2$. The reduction in energy density is the result of the inefficient combining, since only the optical fiber core carries optical energy, not the inactive or unused areas within the output fiber bundle packing. Additionally, the precise alignment of each lens 108a and associated emitter 104a to assure only the fiber core is fully illuminated is problematic and difficult to manufacture in a repeatable manner, and also is subject to thermal and mechanical effects. Furthermore, manipulation and bundling of discrete optical fibers further complicates production fabrication processes, and optical energy reflected from the air/fiber interface which couples back to the laser disrupts the cavity operation of the diode laser and may result in instability or catastrophic failure of the high power laser emitter. Another difficulty is that the use of micro lenses such as 108 could cause surface reflection of optical energy back to the diode laser emitter, resulting in instability of the high Q diode laser cavity.

A simplified optical combiner is desired which provides the capability for combining optical energy from a diode laser array and without the counter propagating reflections of micro lenses 108a such that minimal optical energy is reflected back to the diode laser, and which utilizes waveguide channels to provide the function of combining optical power from each of several diode laser outputs to a single combined optical output of the optical combiner.

OBJECTS OF THE INVENTION

A first object of the invention is a power combiner (or alternatively a power splitter) having a combiner first substrate and combiner second substrate, the first substrate and second substrate having surfaces which are joined to form an air or vacuum optical waveguide channel for guiding and combining or dividing optical energy, the waveguide channels formed from the first and second substrate, which have a higher refractive index than air or vacuum within the waveguide, the substrates optionally coated with one or more individual, or tuned, pairs of thin film depositions, the power combiner having a plurality of optical inputs, each optical input coupled to an optical waveguide formed by the first and second substrates, the optical waveguides coupled to one or more optical energy combiners, the combiners coupled to other optical combiners, or having an optical output waveguide coupled to an optical output.

A second object of the invention is a process for forming a power combiner (or power splitter) on two substrates having thin film coatings for guiding optical energy inside channel waveguides formed in one or both substrates, the process having a step of forming a plurality of channels in one, or both, of the optical combiner substrates, the plurality of channels leading from one edge of the combiner or splitter to one or more waveguide combiner structures which merge to form a single waveguide channel coupled to a second edge of the combiner (or splitter); the process also having a step of joining the first substrate and second substrate surfaces to each other, bringing into contact the substantially planar surfaces into which the waveguide channels and waveguide channel combiners are formed, to enclose the waveguide channels and combiner structures. In one example embodiment, the process utilizes a first substrate and second substrate, both substrates having waveguide channels formed into a substantially planar surface of each substrate as mirror images, such that the waveguide channels of the combiner or splitter are formed by placing the substantially planar surfaces with etched features in contact with each other and aligning the surfaces such that the waveguide channels are formed by the waveguide channels of the first substrate and second substrate, or alternatively, in another embodiment of the invention, the waveguide channels are formed entirely on a surface of a first substrate and enclosed by a substantially planar second substrate placed over the first substrate surface. Either example embodiment may include a thin film layer deposition step whereby at least one layer pair of thin film material is coated or diffused onto the waveguide channels of the first and/or second substrate surfaces either prior to or after a joining step coupling the first substrate to the second substrate which forms the combiner or splitter containing said waveguides.

SUMMARY OF THE INVENTION

An optical device has a plurality of apertures on one edge surface and a single aperture on an opposing edge surface. In one example embodiment of the invention, the optical device operates as a power combiner wherein optical power is applied to the plurality of apertures on one edge surface, the optical power combined by the optical device through a series of waveguide combiners formed on a planar substrate and substantially perpendicular to the edge surface, with the combined optical power delivered to an opposing edge surface single aperture. In another example embodiment of the invention, the optical device operates as a power splitter, whereby optical power is applied to the single aperture of an edge surface, and split into optical power delivered to the plurality of apertures on an opposite edge surface, using the same structures as were described for the optical combiner.

In the case of an optical power combiner, the plurality of input apertures are formed into a lower first substrate and/or upper second substrate of the optical device, each substrate having a substantially planar joining (or bonding) surface, where the contact mechanism may be externally applied pressure, adhesive, or other persistent force which maintains the two substrates in contact. The plurality of input apertures are directed to one or more optical combiners having a plurality of input apertures, each input aperture coupled to an associated input waveguide channel, the optical combiner having an output aperture coupled to said waveguides, which may subsequently be coupled to other optical combiners, or to an output waveguide channel. In a first example of the invention, the optical combiners, input waveguide channels, and output waveguide channels are formed into a lower first substrate which has a substantially planar second substrate covering the waveguide channels and optical combiners of the first substrate, or in an alternative example of the invention, the waveguide channels of the first substrate and waveguide channels of the second substrate are mirror images of each other and placed in contact with the first substrate and first substrate aligned together and subsequently joined to each other. The joining may be accomplished by a pressure contact, an adhesive, or any other method which places the surfaces of the first substrate and second substrate in contact with each other. The depth of waveguide channels formed in the first and second substrates may be the same depth or different depths. The limiting cases are waveguide channels formed in the first or second substrate only with the respective second or first substrate being planar to enclose the waveguide channels.

The first or second substrate may receive thin film depositions for improved waveguide characteristics, either before or after the surfaces are joined, and it is also possible to apply the thin film depositions to only the waveguide inner surface, or also to the surfaces of the first and second substrates.

BRIEF DESCRIPTION OF THE DRAWINGS

FIG. 2A is an end view of an optical combiner having waveguide channels formed into a first substrate and also a second substrate such as shown in view C-C of FIG. 3.

FIG. 2B is an end view of an optical combiner having waveguide channels formed into a first substrate which is in contact with a substantially planar second substrate such as view C-C of FIG. 3.

FIG. 3 is a top view of a substrate of an optical coupler element such as view A-A of FIG. 2A or FIG. 2B.

FIG. 4A is an end view of an optical combiner having waveguide channels formed into a first substrate and also a second substrate, such as view B-B of FIG. 3.

FIG. 4B is an end view of an optical combiner having waveguide channels formed into a first substrate which is in contact with a substantially planar second substrate, such as view B-B of FIG. 3.

FIG. 5B-1 is a view of FIG. 5A through section C-C for waveguide channels formed into only the first substrate.

FIG. 5C-1 is a view of FIG. 5A through section D-D for waveguide channels formed into only the first substrate.

FIGS. 9A, 9B, 9C, 9D, and 9E show cross section view of the waveguides of FIGS. 3, 7A, 7B, and 8A for various substrate arrangements and coating types.

DETAILED DESCRIPTION OF THE INVENTION

In general, an optical power combiner such as shown in FIG. 3, for which device 308 is providing optical power such as with a diode laser emitter array, operates to combine optical power applied to each of a plurality of optical input ports 304A to 304G into optical power delivered to a single output port 206. The optical combiner of the present invention is bidirectional, so as to alternatively be useful as an optical splitter in which optical power may alternatively be applied to the single port 206 and split into the plurality of individual ports 304A to 304G, for which device 308 is then receiving optical power such as with a detector array, or with fibers coupled to the ports 304A to 304G to deliver the power elsewhere, rather than concentrating the input optical power for the case of a combiner. For clarity in describing and understanding the current figures, the present device will be referenced as a power combiner having a combiner first substrate 202A and a combiner second substrate 202B, the two substrates joined together and collectively referenced as substrate 202, however it should be understood that the device is bidirectional and may also be used as a power splitter with optical power applied instead to port 206 and removed from ports 304A through 304G.

Figure 8A:
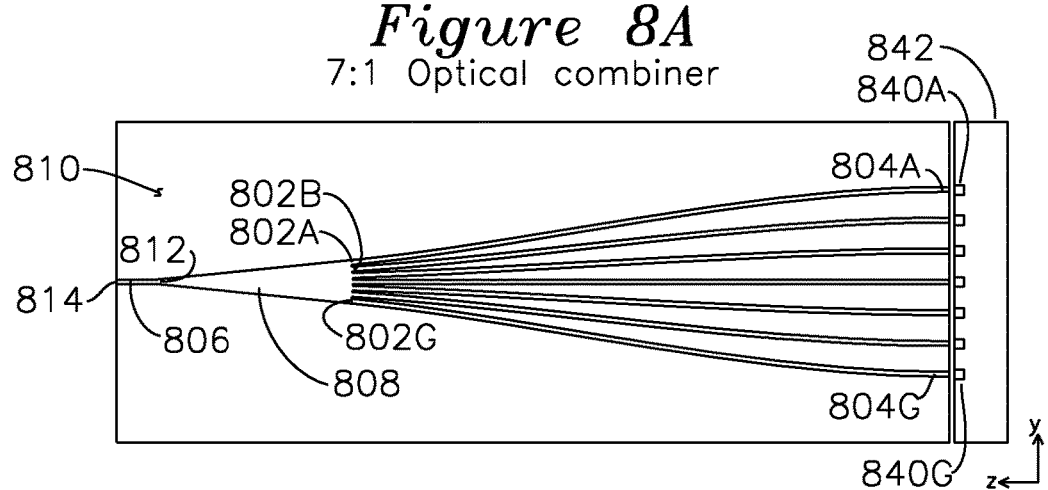
FIG. 8A shows a 7:1 optical coupler having a single combiner region.

FIGS. 2A, 2B, 3, 4A, and 4B show various views of alternative example embodiments for the power combiner mode of the present invention. FIGS. 2A and 4A show an optical combiner/splitter according to one example of the invention using symmetric first substrate 202A and second substrate 202B which are placed with their substantially planar surfaces (which surfaces have been etched to form waveguide channels and optical combiner structures) adjacent to each other to form the waveguide channels. FIGS. 2B and 4B show an alternative example of the invention where a second substrate 202B has a substantially planar surface which is in contact with the etched waveguide features formed in first substrate 202A. An underlying support 204 provides mechanical support for several structures including first substrate 202A (which may be integral with support 204) and second substrate 202B, and diode laser array 308, as seen in FIGS. 5B, 5C. First substrate 202A contains internal channels forming waveguide structures containing air or vacuum core, the air or vacuum having a lower core optical refractive index than the refractive index of the materials of first substrate 202A or second substrate 202B. FIG. 2A shows an output edge view C-C of the device of FIG. 3 with output aperture 206, and FIG. 4A shows an input edge with apertures 304A, 304B, . . . 304G of view B-B, with the combiner first substrate 202A shown in FIG. 3, which also shows the diode laser array 308 with associated individual emitters 306A, 306B, . . . 306G etc. The diode laser array 308 is typically configured with a particular number of emitters, as was described in the prior art of FIG. 1, and accordingly diode laser array 308 normally has a circle packing lattice number of outputs N such as N=7, 19, or 37, although it would be possible to use an even number of diode laser array outputs (N=2, 4, 6, 8, etc) which allows for symmetry of combining, or a power of 2 for the successive channel summing, for example 16 input channels summing as pairs to 8 channels, and those 8 channels summing as pairs to 4 channels, those 4 channels paired to form 2 channels, and the final 2 channels paired to become a single channel. Other optical combiners such as 3:1, 4:1, 7:1 (as shown in FIG. 8A), 19:1, etc, are also possible for arbitrary numbers N of input waveguide channels to the optical combiner. In this manner, for N=16, alternative device operation as a splitter with power to applied to the single channel would provide uniform power distribution to each of the 16 channels. It is also clear that the channel splitting configuration could be arranged in other ways, including n-channel splits at each bifurcation point, and in the splitter configuration, the septum of each split could be moved from a waveguide channel centerline to an offset position with respect to waveguide centerline to collect more power in one waveguide channel than an adjacent waveguide channel.

The number of diode laser outputs can be tailored to an optimum number based on power transfer through the outermost waveguides, as the outer waveguides tend to have a smaller radius of curvature, with associated increased optically attenuating waveguide bends and corresponding optical losses. The combiner first substrate 202A waveguide channels of FIG. 3 show an example arrangement for receiving optical power from diode laser array emitter 306A to 306G to respective aperture 304A to 304g such that the optical power from each optical emitter 306A to 306G of FIG. 3 is collected at waveguide input apertures 304A to 304G and summed and delivered to output aperture 206. FIGS. 2A and 2B show end views of example embodiments with output aperture 206 formed between first substrate 202A and second substrate 202B, both of which are placed on support 204. FIGS. 4A and 4B, corresponding to the substrate 202 structures of FIGS. 2A and 2B, respectively, show the opposite edge view B-B, with the first substrate 202A and second substrate 202B mounted on support 204, which also supports the diode laser array 308, thereby providing precise alignment between the optical emitters 306A to 306G, and the respective waveguide inputs 304A to 304G.

In another example of the invention, each emitter of the diode laser array has a resonant optical cavity which generates optical energy propagating in the direction of the z axis, but has an elliptical or oval emission intensity profile at the diode laser output aperture, with the output of the diode laser having optical energy which is polarized in the x axis, and where the diode laser has a narrower aperture in the y axis (such as 1 μm) and a comparatively longer aperture (such as 100 μm) in the x axis. A diode laser may have a "fast axis" (shown in the present examples as the y axis) with greater beam divergence than the "slow axis" (shown as the x axis in the present examples) which has less beam divergence than the fast axis. Because of the inherent greater beam divergence in the y axis than the x axis at the laser emission aperture, the beam spread characteristic after propagation down the z axis is greater in the y axis than in the x axis, which causes the optical energy to change from having a radiation pattern with its long axis in x near the diode laser emitters, to a radiation pattern with its long axis in y near the optical combiner input apertures. The extent of the beam profile change at the combiner input aperture is naturally a function of the separation distance between the diode laser array and the optical combiner input apertures, but it is desired to arrange this spacing to capture the maximum available beam energy while providing mechanical clearance between the diode laser array and the optical combiner. Alternatively, beam forming optics could be placed in the space between combiner 202 and diode laser array 308 to reduce beam spread in the y axis.

Figure 5A:
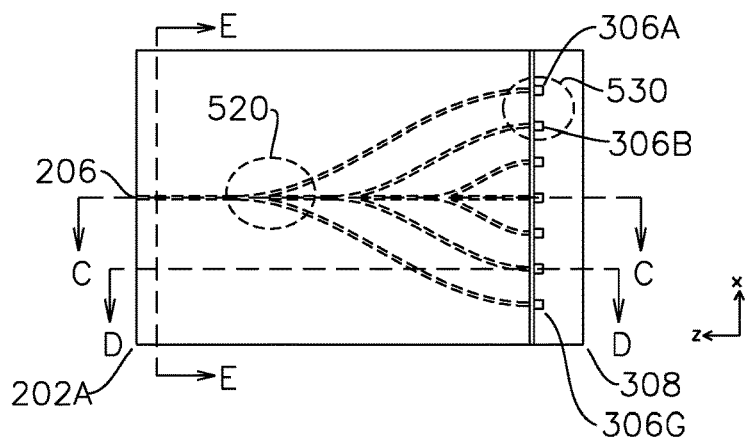
FIG. 5A is a top view of an optical source coupled directly to an optical combiner.
Figure 5B:
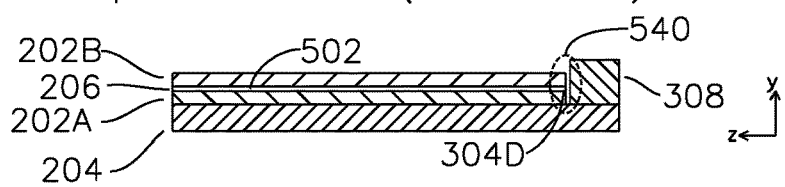
FIG. 5B is a view of FIG. 5A through section C-C for waveguide channels formed into both the first and second substrates.
Figure 5C:
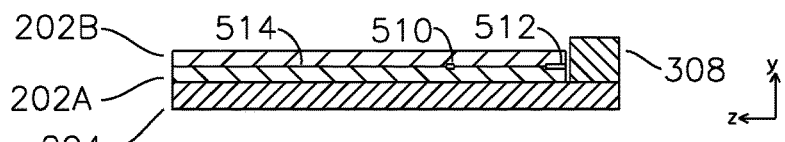
FIG. 5C is a view of FIG. 5A through section D-D for waveguide channels formed into first and second substrates.
Figures 1, 5B:
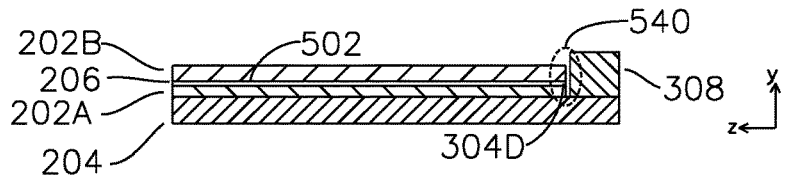
Figures 1, 5C:
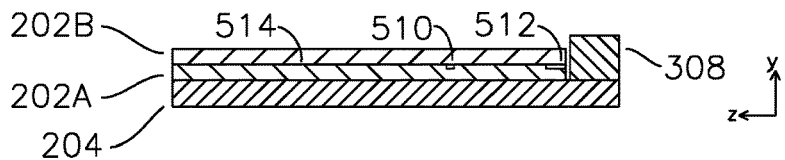
Figure 6A:
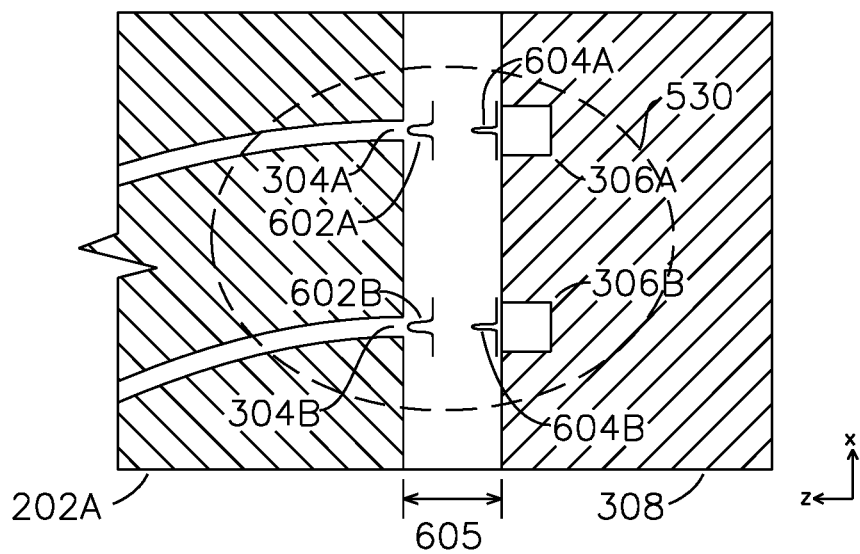
FIG. 6A is a detail view of region 530 of FIG. 5A.

FIG. 5A shows a top view of an optical combiner 202, with the optical channels formed between the first substrate 202A and the second substrate 202B, and the diode laser array 308 individual emitters 306A and 306B of region 530 shown in detail view FIG. 6A, which also shows the diode laser slow axis beam plot 604A along the x axis near the laser emitter 306A/306B output aperture and somewhat wider beam plot 602A/602B with relatively minor beam spreading at the aperture input 304A/304B, with the aperture inlet and separation spacing 605 selected to provide maximum coupling of optical energy from diode lasers of 308 into the inlet aperture 304A/304B. As described earlier, the diode laser output beam 608 fast axis is y, so the extent in the y direction is initially narrower as shown in 608A at the diode laser 306A output than the extent in the x direction near the diode laser output as shown in 604A, but the fast axis beam profile diverges more rapidly in the y axis with increasing distance along the z axis, as shown in the plot 606A of FIG. 6B.

In one example of the invention, the diode laser output aperture (such as 306A) is on the order of 100 μm wide in the x axis, on the order of 1 μm tall in the y axis, and the device input aperture 304A is on the order of 110 μm tall in the y axis and 110 μm wide in the x axis. In another example of the invention, the pitch (spacing from center to center) of the diode laser emitters in the x axis is 500 μm. The pitch of the optical combiner input apertures is matched to the pitch of the diode laser emitters. Accordingly, the input aperture 304A may be have other aspect ratios or dimensions, however the dimensions of the input aperture is selected to provide maximum capture of the optical energy emitted by the diode laser radiation profile. In one example embodiment, the combiner input aperture has a width in the x axis (the diode laser slow axis) sufficient to capture more than 95% of the optical intensity of the optical radiation pattern from the diode laser at the input aperture, and a height in the y axis (diode laser fast axis) sufficient to capture more than 95% of the optical energy in the y axis at the waveguide input aperture.

Figure 6B:
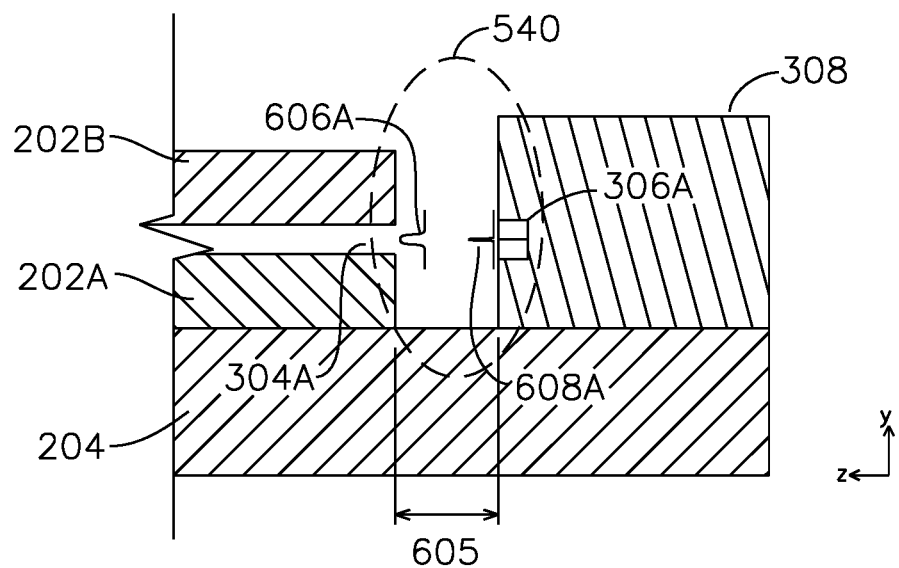
FIG. 6B is a detail section view of region 540 of FIG. 5B.

FIG. 5B, a view of FIG. 5A through section C-C, shows the central waveguide channel 502 from input aperture 304D to output aperture 206. Input aperture coupling region 540 is shown in detail view FIG. 6B, with an individual emitter such as 306A generating a narrow output beam profile with a fast axis divergence shown as 606A, the fast axis optical radiation pattern captured by the input aperture 304A, as shown in FIG. 6B.

FIG. 5C shows section D-D of FIG. 5A, including the substantially planar surfaces of combiner halves 202A and 202B mated together at joint 514, and glancing sections of internal channels 510 and 512 which are intersected by the section line D-D of FIG. 5A.

Figure 1:
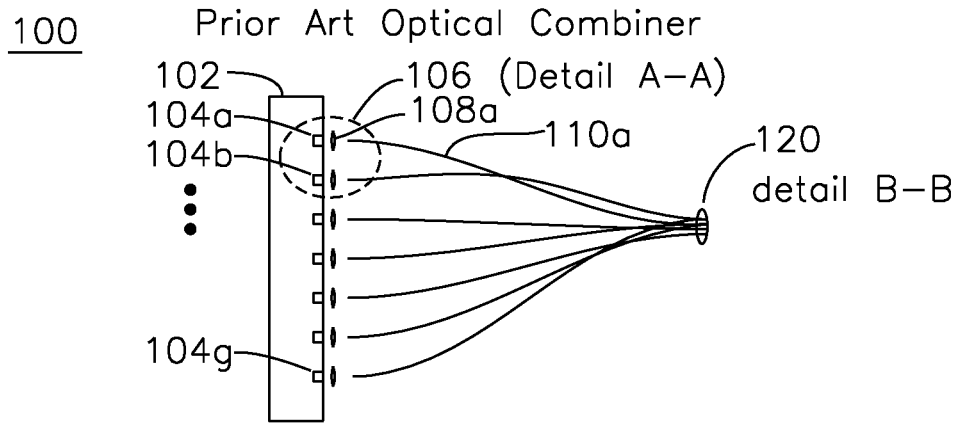
FIG. 1 is a top view of a prior art optical combiner comprising individual optical fibers coupled to a diode laser array.
Figure 1A:
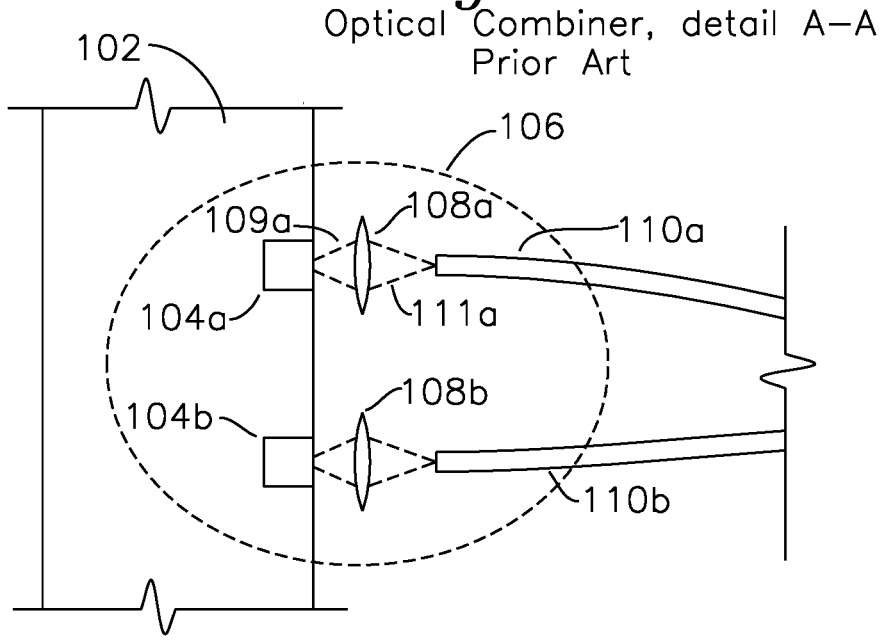
FIG. 1A is a detailed view of a region of FIG. 1.
Figure 1B:
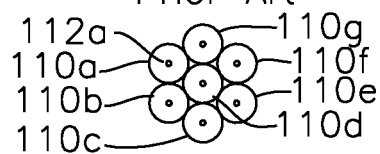
FIG. 1B is a view at the output terminus of a bundle of optical fibers of FIG. 1.

FIGS. 5B and 5C show examples of waveguide channels formed into both first and second substrates 202A and 202B. FIGS. 5B-1 and 5C-1 show the waveguide channels formed into the first substrate 202A, with the substantially planar second substrate 202B enclosing the waveguide channels formed into the first substrate 202A.

Figure 7A:
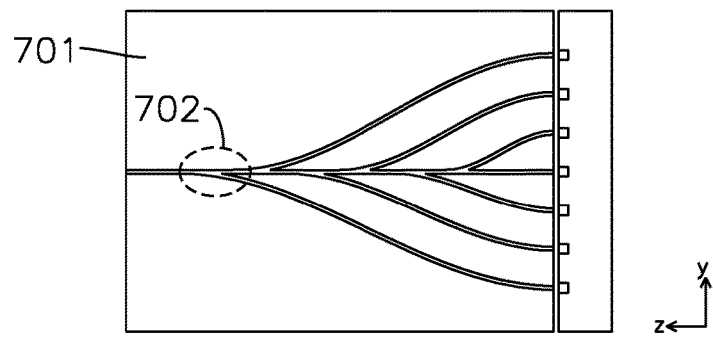
FIG. 7A shows an alternative embodiment of an optical combiner having offset channel couplings.
Figure 7B:
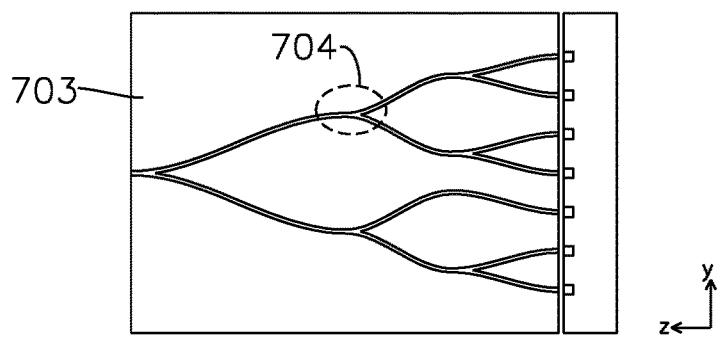
FIG. 7B shows an alternative embodiment of an optical combiner having paired couplings.

FIG. 7A shows an alternative arrangement for the combiner substrate 701 with offset combining structures such as 702 such that only two waveguide channels are combined at a time. FIG. 7B shows an alternative combiner substrate 703 with a succession of two channel combiners such as 704, and with each coupled waveguide channel pair having centerline symmetry to ensure uniform power dissipation at each junction, when used as a splitter.

FIG. 8A shows a 7:1 optical combiner 810 with input waveguides 804A to 804G, each coupled to a respective diode laser source 840A to 840G, the waveguide 804A to 804G coupled to the input apertures 802A to 802G of a single multiple waveguide channel combiner 808, the combined optical energy thereafter directed to combiner output aperture 812, then coupled to output waveguide 806 and edge aperture 814, with waveguide 806 having length equal to or greater than zero. The outer walls of the combiner funnel region 808 which converge to the output waveguide may be formed as a triangle with substantially straight walls, or it may be formed as a trumpet or other partial involute.

The design of the inner surfaces of the waveguide preferably ensures maximum optical mode confinement, as optical energy which escapes the waveguide formed by the waveguide channel and associated optical coatings represents undesired propagation loss and, for high power operation, heating of the substrate in the regions of power loss.

Figure 9E:
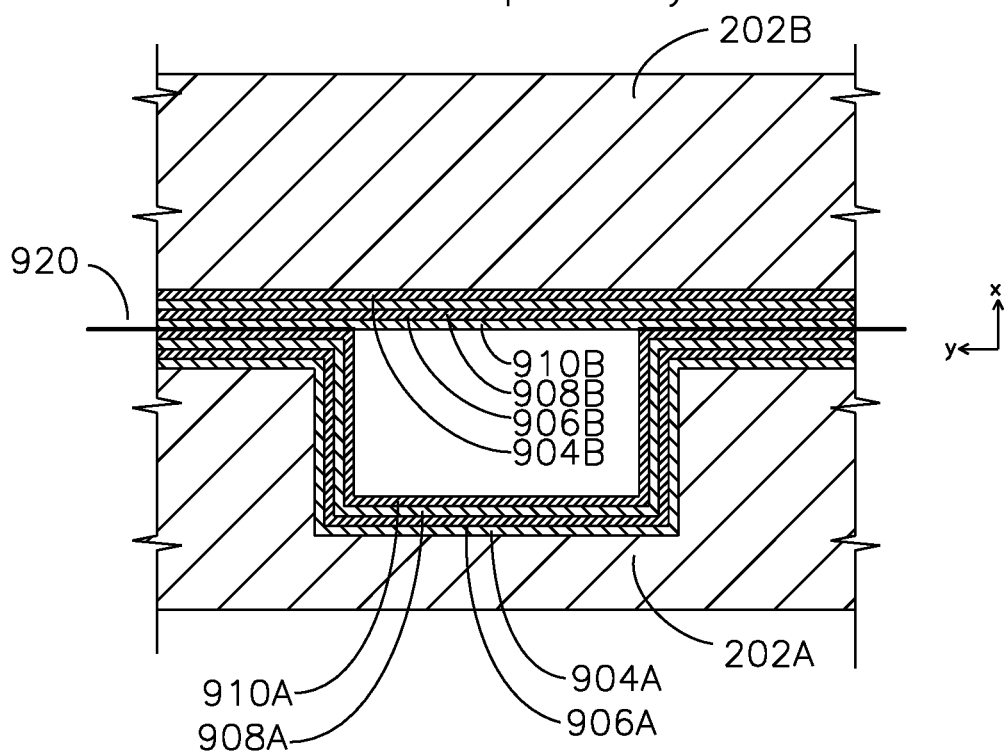

FIG. 9A (not to scale) shows a cross section view C-C of FIG. 5A, and FIGS. 9B, 9C, 9D, and 9E (also not to scale) show various cross section views E-E of FIG. 5A, showing various possible coatings 904A, 906A, 908A, 910A applied to first substrate 202A, and coatings 904B, 906B, 908B, 910B applied to second substrate 202B. The coating profiles are maintained through the waveguide extents and waveguide combiner extents. FIGS. 9A and 9B show section C-C and E-E, respectively, of FIG. 5A where the thin film coatings are applied only to inner waveguide surfaces. FIG. 9C shows an example embodiment where the thin film coating pairs are applied to the waveguide channel of first substrate 202A, and the first substrate surface is partially, or entirely (not shown) coated over its surface. FIGS. 9D and 9E show an example embodiment where the first substrate 202A and second substrate 202B are uniformly covered with thin film coatings, where FIG. 9D shows the two waveguide channels formed into the first substrate and second substrate, and FIG. 9E shows the waveguide channel formed into the first substrate 202A with the second substrate 202B acting as a waveguide channel enclosure.

Figure 10:
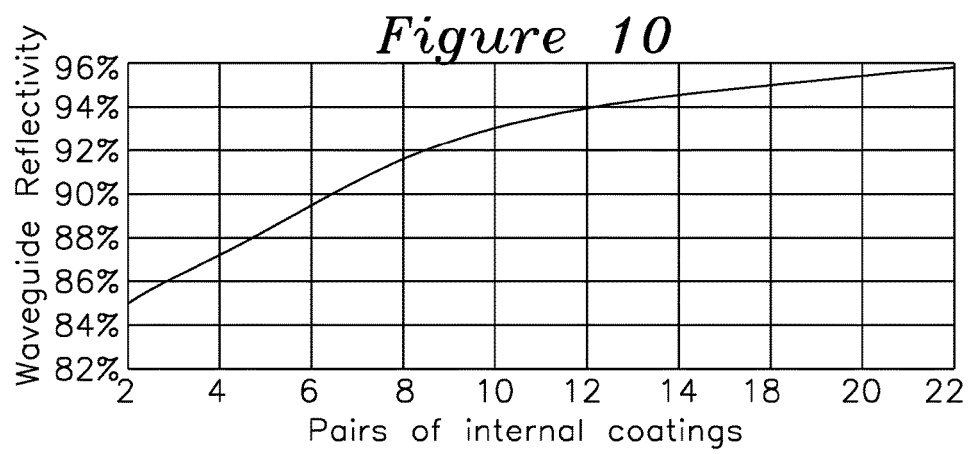
FIG. 10 shows a plot of waveguide reflectivity vs. number of pairs of thin film coatings.

In one example of the invention, the waveguide channels within first substrate 202A are formed by an etching process which provides the required waveguide channel paths such as were shown in FIGS. 3, 5A, 7A, 7B and 8A, and a subsequent deposition operation provides waveguide channel thin film coatings on the surfaces, such as coatings 904A, 906A, 908A and 910A of first substrate 202A and coatings 904B, 906B, 908B, and 910B of second substrate 202B. The number of thin film coating pairs may be optimized to achieve minimum loss. The plot of FIG. 10 shows an example of the relationship between pairs of thin film coatings for various silicon oxynitride ($SiO_xN_y$) combinations and silicon nitride ($Si_xN_y$) combinations vs. the transmission efficiency of the resulting waveguide. Typical thin film thicknesses are on the order of $\lambda/10$, with a surface flatness on the order of $\lambda/100$ or better. For example, at wavelength $\lambda=1500$ nm, the thin film coatings are on the order of 150 nm and the surface flatness is on the order of 15 nm.

FIG. 9A shows a waveguide channel in the y-z plane (where z is in the direction of propagation), which may have been fabricated using a chemical etch process, or preferably a Deep Reactive Ion Etch (DRIE) or other applicable process, with the required waveguide channels etched as shown in FIG. 2A, 2B, 3, 4A, 4B, 5B, 5C, 5B-1, 5C-1, 7A, 7B, or 8A, followed by the application of respective thin film coatings 904A, 906A, 908A, and 910A to the first substrate waveguide channel 202A, and thin film coatings 904B, 906B, 908B, and 910B applied to the second substrate waveguide channels 202B. In one embodiment, the first substrate 202A and/or second substrate 202B are deposition coated with pairs of $SiO_xN_y$ and $Si_xN_y$ using Plasma Enhanced Chemical Vapor Deposition (PECVD), or similar deposition mechanism for providing the thin film layers to the inner surfaces of the combiner halves—first substrate 202A and second substrate 202B. The outer surfaces may also be coated with matching thin films in a similar manner, or as part of the same coating process, to minimize stress built up in the substrate to minimize bowing, cracking, or other stress related effects.

To ensure the coatings are applied only to the inner surfaces of the waveguides, a polishing or etching step may be performed after film deposition on the mating surface 920 between 202B and 202A, such that the mating line 920 is free of thin film coatings to avoid allowing miniscule amounts of optical energy leaking out through the thin films on the mating surfaces. For the asymmetric substrate case such as FIGS. 2B and 4B, the lower first substrate 202A may be pretreated for joining purposes. The function of the thin film pairs is thereby to provide containment of optical mode and minimum loss of optical energy as the optical mode propagates through the waveguide formed by the upper and lower substrates 202B and 202A, respectively, and the associated thin films which are applied to them.

Figure 11:
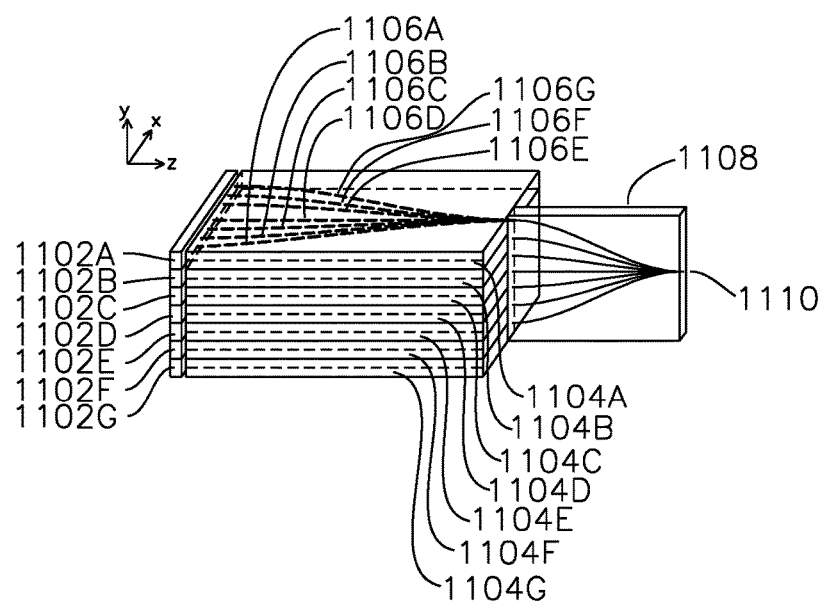
FIG. 11 shows a perspective view of an M×N combiner system, where M=number of optical combiners and associated diode laser arrays, and N=number of input waveguide channels in each optical combiner and diode laser elements in each laser array.

While the preceding FIGS. 3, 5A, 7A, 7B, and 8A show various configurations for summing optical power from a single diode laser array, FIG. 11 shows an example configuration for summing the output power of M individual optical combiners 1104A, 1104B, 1104C, 1104D, 1104E, 1104F, and 1104G, each individual optical combiner having a waveguide combiner with an output, each waveguide combiner output thereafter coupled to a final combiner 1108, the final combiner 1108 of similar construction as the individual optical combiners such as 1104A, where the final combiner 1108 can sum the outputs of the M substrate pairs 1104A through 1104G, each of which deliver optical energy from their respective N combined optical sources 1102A through 1102G, thereby providing M×N optical combining capability of power M×N compared to 1×N for a single laser array coupled to a single combiner. The final combiner 1108 may be oriented in a plane perpendicular to the plane of the individual optical combiners 1104A through 1104G. The example of M=7 and N=7 is shown for clarity, the values of M and N may be arbitrary integers.

The first substrate 202A and second substrate 202B of FIG. 9B or 9D may be joined or bonded together using any available process for joining or bonding the upper combiner second substrate 202B with the lower combiner first substrate 202A, including anodic bonding at temperatures of approximately 400 degrees Celsius, and for the case of symmetric substrates, the upper and lower halves aligned using optical or mechanical methods prior to joining or bonding, to ensure that the waveguide channels and ports are aligned and match each other.

It is understood that many aspects of the invention may be modified from the examples shown while preserving the central aspects of the invention. For example, the diode laser array was described as having an output aperture of substantially 1 μm in the y direction and substantially 100 μm in the x direction, however it is understood that "substantially" may provide an order of magnitude (factor of 10) greater or smaller range for other purposes or wavelengths. Similarly, the channels of the optical combiner were described as having dimensions of 110 μm in the y direction and 110 μm in the x direction, however the y and x dimensions of the input aperture and associated waveguide channels may be of any size which captures the optical energy diverging from the diode laser emitters, according to the well known numerical aperture (indicating angle of divergence) in the respective x and y axis, and the center to center spacing (pitch) of emitters in the diode laser array may be of any spacing. Prior art diode laser optical arrays may have a different pitch, e.g. 125 μm or 250 μm, to provide convenient coupling into optical fibers positioned in a linear array adjacent to each other, where the optical fibers have 250 μm cladding. In the present invention, no such limitation is suggested, as the pitch of the optical combiner input apertures need only match the pitch of the emitters in the associated diode laser array. "Substantially different" wavelength sources are understood to be distinct when the power spectral density of one source having a primary power wavelength compared to the spectral density of another source having an adjacent primary power wavelength where the primary wavelength power levels differ by more than 20 dB between adjacent primary power wavelengths.

A consideration for wide range of operation over temperature, particularly when the diode laser array emitters are high output power devices, is to match the coefficient of thermal expansion (CTE) characteristic of the optical combiner 202 to the CTE of the diode laser array support 308 and CTE of the support 204. In one example embodiment of the invention, the combiner 202 is etched Silicon (Si), and the substrate 204 may be fabricated from, or contain, at least one of: glass, sapphire, synthetic diamond, or diamond-like carbon (DLC). In certain embodiments, only metals with an extremely low CTE over the range of operation may be used. In another example embodiment, the tendency of the diode laser array to "smile" in response to temperature changes in the diode laser array ("smile" is a thermal or aging change where the ends of the diode laser array elevate in y compared to the center of the array, thereby reducing coupling of the optical beams into the input apertures such as 304A and 304G at the ends of the combiner) may be compensated by a sandwich of substrate materials 204 which "smile" in the opposite direction to cancel this effect and provide emitters which remain aligned with the input apertures of the combiner 202, or to provide for the combiner substrates 202 to "smile" in the same direction and deflection extent as the diode laser array which is coupling energy into substrates 202. The "smile" effect may be more pronounced with a larger number of emitters such as N=19, or large emitter pitch. In another example embodiment, the substrate 204 provides sufficient stiffness to reduce the "smile" of the diode laser array 308, thereby improving the optical coupling.

In one aspect of the invention, the optical emitters are all substantially monochromatic, such that the device of FIG. 3, 5A, 5B, 5C, 5B-1, 5C-1, 7A, 7B, or 8A operates as a combiner for monochromatic optical energy, providing an output power in a single output waveguide channel which is the sum of the monochromatic optical energy provided to the input channel. Substantially monochromatic optical energy is understood to be optical energy which has a bandwidth of ⅟1000 of its optical center wavelength, and other optical emitters have less than −20 dB power bandwidth which is also within this same bandwidth.

In another aspect of the invention, the optical emitters of the diode laser array are selected to provide a plurality of different wavelengths, thereby providing a polychromatic source, with the output waveguide aperture carrying a combination of the input power provided by each contributing diode laser emitter at a unique or shared wavelength.

In another aspect of the invention, the thin film coatings shown in FIGS. 9A through 9E may be applied after joining or bonding the upper substrate 202B and lower substrate 202A, or the thin film coatings may be applied to the channels prior to joining or bonding, such as by masking the mating surfaces, or by coating the mating surfaces of the upper combiner 202B and lower combiner 202A, and then polishing or otherwise stripping the coatings. In another example embodiment, the thin film coatings may be applied to the joining surface and channel surfaces together in a single process step, and the combiner halves 202B and 202A mated together with the thin film coatings present in the mated joint as well as the waveguide channel, although this may potentially increase waveguide losses of the combiner. In one example embodiment, the optical waveguide losses through the combiner are characterized as the loss in dB from the applied input power to the sum of output power, where in the case of the combiner, the sum of output power is not more than 12 dB less than the applied power across all of the input waveguide ports, and in the case of a divider, the sum of the divided power outputs is not less than 12 dB below the applied input power.

In another example of the invention, the bifurcations of the waveguide which divide or sum power may be done in a variety of different ways to achieve different results. For example, the bifurcation shown in the region 520 of FIG. 5A provides a 3-way summing or 3-way division. While the power summing will be reasonably uniform from the three input ports towards the single output port, the power division could be unequal, because for a traveling mode where most of the power is centrally located, that power may tend to continue down the central waveguide compared to the two side waveguides at the point of bifurcation. The region 702 of FIG. 7 shows a similar asymmetrical splitting at the bifurcation, although in operation as a combiner, this geometry may not have significant effect. For power splitter use, the symmetric treatment of the bifurcation at region 704 of FIG. 7B may provide symmetrical division of power within the single waveguide region and result in equal power in the two waveguide ports after division. It is clear to one skilled in the art that the geometry, symmetry, or number of split ports at each bifurcation may be varied to accomplish a variety of desired performance characteristics for both combiner and splitter modes.

We claim:

1. An optical device having:
    a first and second substrate having substantially planar mating surfaces, the substantially planar mating surfaces in direct contact with each other, at least one of said first substrate or said second substrate having a first edge on a surface adjacent to said substantially planar surface, and a second edge opposite said first edge;
    a plurality of waveguide channels formed in at least one of said first substrate or said second substrate substantially planar surface and extending to said first edge;
    a single waveguide channel formed in at least one of said first substrate or said second substrate of substantially planar surface and extending to said second edge;
    each said waveguide channel formed by partial removal of said first substrate or said second substrate in the region of said waveguide channels;
    one or more waveguide channel combiners formed in at least one of said first or said second substrates, said waveguide channel combiners having two or more waveguide channel apertures, each said waveguide channel aperture coupled to a corresponding waveguide channel and having a single waveguide channel aperture on an opposite end, said single waveguide channel aperture coupled to either another waveguide channel combiner or to said single waveguide channel;
    said waveguide channels having at least two alternating deposition layers on the order of a tenth of a wavelength in thickness to form a void for propagation of optical energy;
    the deposition layers having differing indices of refraction for minimizing optical energy propagating in the channels from being absorbed by the first substrate or the second substrate.

2. The optical device of claim 1 where said first substrate is joined to said second substrate.

3. The optical device of claim 2 where said joining is at least one of a mechanical force, an adhesive, or an anodic bond.

4. The optical device of claim 1 where said first substrate includes a support, said support includes a diode laser array, each diode laser of said diode laser array is optically coupled to a corresponding one of said plurality of waveguide channels.

5. The optical device of claim 1 where said first substrate and said second substrate form waveguide channel apertures on the order of substantially 110 μm in height perpendicular to said substantially planar surface and on the order of 110 μm in width across and edge of said substantially planar surface.

6. The optical device of claim 4 where a plurality of optical emitters couple optical energy into said plurality of waveguide channels.

7. The optical device of claim 1 where optical energy is applied to said single waveguide port and is removed from said plurality of waveguide channels.

8. The optical device of claim 1 having a single waveguide combiner.

9. The optical device of claim 8 where said waveguide combiner outer extent is triangular.

10. The optical device of claim 8 where said waveguide combiner outer extent is a partial involute.

11. The optical device of claim 1 where said first substrate and said second substrate are silicon.

12. The optical device of claim 1 where said deposition layers are thin film coatings which include at least one of silicon oxynitride ($SiO_xN_y$) or silicon nitride ($Si_xN_y$).

13. The optical device of claim 12 where said thin film coatings are applied in pairs.

14. An optical device formed from a first and second substrate, each said substrate having:
    a substantially planar joining surface, each substantially planar joining surface having:
        at least one of said first or said second substrate having:
            a first waveguide channel leading to a first edge, said first channel bifurcating into a plurality of channels leading to a second edge;
            said first waveguide channel formed by the partial removal of said first or second substrate, said first waveguide channel coated with one or more pairs of deposition films, each pair of deposition film formed from depositions having a differing index of refraction,
            the deposition films reducing losses for the propagation of optical energy in a void substantially surrounded by the deposition films;
        said first and second substrates bonded to each other at said joining surfaces, the voids thereby forming waveguide channels.

15. The optical device of claim 14 where said substrate includes a support having a plurality of optical emitters, said optical emitters having optical outputs, each said optical output coupled to a corresponding waveguide channel.

16. The optical device of claim 15 where said plurality of optical emitters is a diode laser array.

17. The optical device of claim 14 where at least two of said plurality of optical emitters operates at substantially the same wavelength.

18. The optical device of claim 14 where at least one of said first substrate or said second substrate includes a waveguide channel combiner.

19. A process for fabricating an optical combiner or splitter, the process operative on a first and second substrate, each substrate having a substantially planar joining surface the process comprising:
    a step of forming waveguide channels by etching said waveguide channels into at least one said substrate joining surface, said waveguide channels including at least a waveguide channel combiner, a plurality of waveguide channels coupled to said waveguide channel combiner, and a waveguide channel coupled to a substrate edge;
    a step of depositing one or more layer pairs of thin film coating on each said substrate, said one or more layer pairs including at least one of silicon oxynitride (Si-O$_x$N$_y$) or silicon nitride (Si$_x$N$_y$);

a step of bonding said first substrate and said second substrate directly to each other using said joining surfaces, thereby forming optical waveguides having a plurality of waveguides on one edge coupled to a single waveguide on an opposite edge;

said optical waveguide thereby forming a void surrounded by one or more layer pairs of thin film coatings for the propagation of optical energy.

20. An M×N optical combiner comprising:

a first plurality M of substantially planar optical combiners, each said optical combiner in a parallel plane with other substantially planar optical combiners, each optical combiner comprising:

a plurality N of input waveguide channels;

each said waveguide channel formed by removing material from the substrate to form the inner regions of each channel, the inner regions of each channel having at least two thin film depositions, the thin film depositions having differing index of refraction and forming a void for propagation of optical energy;

at least one waveguide channel combiner, said waveguide channel combiner having a plurality of input apertures, each said input aperture coupled to one of said input waveguide channels, said waveguide channel combiner having an output aperture coupled to an output waveguide channel of said planar optical combiner;

a final optical aggregator having a plurality M of input waveguide channels and an output waveguide channel, said final optical aggregator substantially perpendicular to the substantially planar optical combiners, each said input waveguide channel coupled to a unique one of said planar optical combiner output waveguide channels, said final optical aggregator functioning as a secondary combiner having a plurality of aggregator waveguide combiner apertures, each said aggregator waveguide combiner aperture coupled to a unique one of said aggregator input waveguide channels, said final optical aggregator having an output coupled to said aggregator combiner output waveguide channel;

said input waveguide channels, said output waveguide channels, and said optical combiner formed by the voids in said substrate.

\* \* \* \* \*